Jan. 10, 1961 J. E. CURRY 2,967,642

ORIENTING APPARATUS

Filed June 10, 1957 4 Sheets-Sheet 1

JAMES E. CURRY,
INVENTOR.

BY Spensley and Horn

ATTORNEYS

ORIENTING APPARATUS

Filed June 10, 1957

JAMES E. CURRY,
INVENTOR.

BY Spensley and Horn

ATTORNEYS

Jan. 10, 1961 J. E. CURRY 2,967,642
ORIENTING APPARATUS
Filed June 10, 1957 4 Sheets-Sheet 3

JAMES E. CURRY,
INVENTOR.

BY Spensley and Horn

ATTORNEYS.

Jan. 10, 1961 J. E. CURRY 2,967,642

ORIENTING APPARATUS

Filed June 10, 1957 4 Sheets-Sheet 4

JAMES E. CURRY,
INVENTOR.

BY Spensley and Horn

ATTORNEYS.

2,967,642

ORIENTING APPARATUS

James E. Curry, North Hollywood, Calif., assignor to Pacific Semiconductors, Inc., Culver City, Calif., a corporation of Delaware Filed June 10, 1957, Ser. No. 664,685

14 Claims. (Cl. 221—173)

This invention relates to unilaterally conducting electronic devices and more particularly to an apparatus for automatically orienting the same.

This invention will be described in connection with the orienting of semiconductor diodes for purposes of example only, it being equally applicable to other unilateral electrically conducting devices as well as other two ended devices. Semiconductor diodes are designed to permit electric current to flow in only one direction, called the forward direction. Contrariwise, in the opposite direction, called the back direction, the diode presents an extremely high impedance to the flow of electric current.

In the manufacture and handling of these diodes, it is often desirable to present them all physically oriented in one direction. Of course, since the physical orientation is coincident with the electrical orientation, they will be electrically oriented as well. In fact, this invention capitalizes on this very fact. One example of such a need is the color coding step which is one of the final steps in the manufacture of such diodes. It is clear that in order for all of the diodes of a particular type to bear the same color coding, that they must be presented to the color coding machine oriented in the same direction, so that the color coding will be uniform and constant.

While a visual inspection of certain types of diodes, such as point contact diodes, will reveal the proper orientation thereof, it is apparent that such a manual inspection and sorting thereof by a human operator would be slow and therefore costly. Further, the device being highly miniaturized and sometimes housed in a non-transparent package may not permit of such visual inspection. It is therefore desirable to provide an apparatus employing automatic means for sensing the orientation of the diodes so that a relatively large number of randomly oriented diodes can have their orientation quickly and efficiently determined. Those diodes which are not oriented in a predetermined direction, e.g., the back direction, are thence automatically reversed in direction. The apparatus of the present invention is so constructed and arranged as to receive a plurality of randomly oriented diodes of a particular configuration at the rate of approximately two to five per second, individually sense their direction, and then emit them, all arranged in a predetermined direction.

It is therefore an object of this invention to automatically arrange a plurality of randomly oriented devices having a front and a back end in a predetermined direction.

It is another object of this invention to automatically arrange a plurality of randomly oriented unilaterally conducting electrical devices in a predetermined direction.

It is a further object of this invention to automatically orient a plurality of randomly oriented semiconductor diodes for presentment to a color coding apparatus.

A still further object of this invention is to automatically and individually test each of a plurality of randomly oriented semiconductor diodes and to reverse the orientation of those which are not oriented in a predetermined direction.

In accordance with the present invention there is provided a means for axially aligning and feeding a plurality of diodes in random electrical orientation into an inclined chute to a test station to determine their electrical orientation. An electrical signal representative of the orientation of the diode at the test station is then transmitted to a solenoid which actuates a plunger which is housed within an orienting chamber located at the lower end of the chute. If the diode at the test station is not oriented in a predetermined direction, an electrical signal will be produced which will actuate the solenoid causing the plunger to advance. The diode at the test station will then be released by a second solenoid and will either continue in its original direction or be reversed in direction depending upon the generation of the previously referred to electrical signal. Thus, all of the diodes or similar unidirectional devices are delivered from the apparatus in a predetermined directional orientation.

The novel features which are believed to be characteristic of the invention both as to its organization and method of operation, together with further objects and advantages thereof will be better understood from the following description considered in connection with the accompanying drawings in which one embodiment of the invention is illustrated by way of example. It is to be expressly understood, however, that the drawings are for the purpose of illustration and example only, and are not intended as a definition of the limits of the invention.

Figures 1, 2, 5, 7:
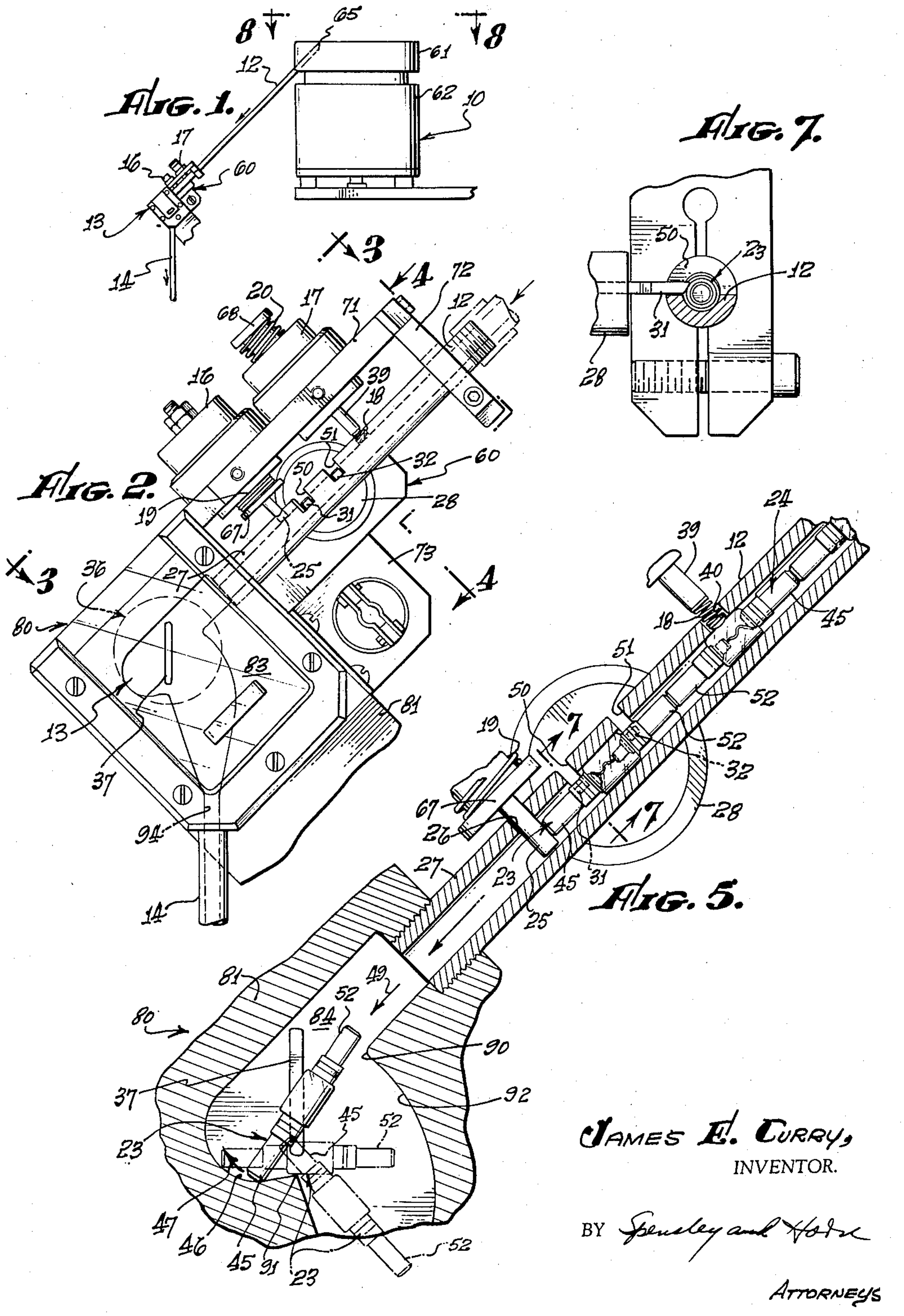
Figure 1 is a front elevation of the apparatus of the presently preferred embodiment of the invention including a Syntron device feeder, the latter being to a larger scale than the former.
Figure 2 is an enlarged view of the apparatus of Figure 1, without the Syntron feeder.
Figure 5 is an enlarged view partly in section of the orienting chamber and inclined chute shown in Figure 2.
Figure 7 is a view taken along line 7—7 of Figure 5.

Referring now to the drawings and particularly to Figures 1, 2, 4, 5 and 7 there is shown a presently preferred embodiment of the apparatus in accordance with the present invention which includes a means 10 for axially aligning the cylindrically shaped diodes 11, a means 60 for determining the electrical direction of the diode, and a means 80 for orienting each diode in a predetermined direction.

Figure 8:
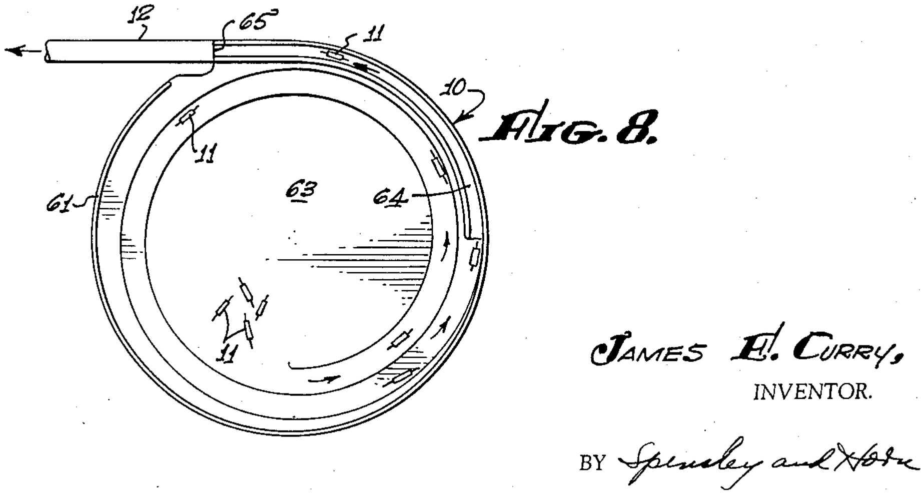
Figure 8 is an enlarged plan view of the Syntron and part of the inclined chute of the apparatus of Figure 1.

As shown in Figures 1 and 8 in the illustrated embodiment the means 10 for axially aligning the diodes in random electrical direction is a vibrating unit of the type well known to the art and manufactured, for example, under the registered trademark "Syntron" by the Syntron Company. The vibrating unit 10 includes a bowl 61 and power unit 62 and is suitably mounted upon a chassis for the apparatus. The receiving bowl 61 of such a unit is substantially cylindrical with a bottom surface 63 slightly tapered from the center to the periphery. A spiraling ramp 64 extends from the bottom surface upward along the inner periphery of the wall to a position proximate the upper edge of the wall where an exit 65 is provided. The power unit 62 vibrates the bowl in such a manner that cylindrical objects such as the diodes 11 are moved to the outer periphery of the bottom surface and caused to proceed up the ramp in end-to-end relation. Thus, a large number of diodes placed in the bowl will be discharged from the exit in end-to-end position in a substantially steady stream but in random electrical direction. That is, the diodes are oriented in either of two directions, the forward or the back direction, in random distribution. For the purposes of clarity and illustration, a diode 11 of a particular construction having a central glass envelope is shown. Into the envelope are sealed metal sleeves and through the sleeves are further sealed metal pins which support a whisker and semiconductor diode crystal as particularly shown in Figure 5.

As inclined chute 12 or guideway is positioned proximate the aligning bowl 61 substantially coextensive with the outlet 65 therefrom. The inclined chute is thus positioned to receive the diodes discharged from the aligning means and is inclined downwardly to cause gravity flow of the diodes 11 from the outlet 65. In the present embodiment the chute 12 is tubular with an inside diameter slightly greater than the largest outside diameter of the diode or other device being tested and is suitably mounted and supported from the chassis by support means not shown.

At a substantial distance from the outlet along the inclined chute 12 the direction determining means 60 is positioned and includes a first solenoid operated gate, a second solenoid operated gate, and solenoid operated direction sensing contacts. Referring to Figures 3, 4, 5 and 7 the first and second solenoid operated gates are longitudinally spaced along the inclined chute 12 at a predetermined distance. The first solenoid operated gate comprises a first pin 25 which is movable transversely to the axis of the chute 12 through the opening 26 in the wall of the tubular chute. The pin 25 is affixed to a first actuating solenoid 16 for transverse movement into and out of the chute through the opening 26. A spring 19 in compression is mounted between the solenoid 16 and a flange 67 affixed to the pin 25 to normally urge the pin 25 away from the solenoid and into the chute. Thus, the pin 25 acts as a gate in the chute which is normally closed, as shown in Figure 5, and which is opened against the spring pressure by energization of the solenoid 16 as described hereinafter. The second solenoid operated gate is spaced away from the first gate toward the outlet 65 by a distance determined by the length of the diode or other device being tested as will become more apparent hereinafter. Thus, the second solenoid gate comprises a second pin 39 which is movable transversely to the axis of the chute 12 through an opening 40 in the wall of the tubular chute. The pin 39 is affixed to a second actuating solenoid 17 for transverse movement into and out of the chute through the opening 40. A spring 20 in compression is mounted between the solenoid 17 and a flange 68 affixed to the extension of the pin 39 at the side of the solenoid opposite the chute 12. The spring normally urges the pin 39 out of the opening 40 to allow a clear passage of the diodes past this point. A resiliently tipped spring 18 is affixed to the end of the pin to engage a diode by friction and prevent its passage when the solenoid is energized to move the pin into the opening as shown in Figure 5. The spacing between the first pin 25 and the second pin 39 is predetermined such that when a first diode 23 is butted against the closed gate formed by the first pin 25, the next succeeding diode 24 will be beneath the second pin 39. Accordingly, as shown in Figure 5, if the first pin 25 is retracted by energizing the first solenoid 16 and the second solenoid is energized to insert the second pin 39, the diode 23 will travel down the chute while the second diode 24 is retained by the friction holding force of the pin 39 and spring 18. The sequence of operation will be more fully described hereinafter, however, in determining the spacing it may be seen from the foregoing that the position of the second pin 39 is such that it will hold back the second diode 24 when the first diode is removed. It may be seen also that the second pin 39 can engage a shoulder or any portion of the length of the second diode 24 and that the spring 18 may be replaced by a resilient rubber point or the like, it merely being provided to present a resilient force against the diode 24 to prevent fracture or damage to the diode. The solenoid operated direction sensing contact comprises a pair of contact fingers 31 and 32 which are affixed to a third solenoid 28 for transverse movement into and out of the chute 12 through openings 50 and 51 in the wall of the tubular chute. The contact fingers 31 and 32 are interconnected for simultaneous movement and are normally urged outwardly from the chute 12 by a spring 69 mounted in compression between the solenoid 28 and a flange 70 affixed to an extension of the contact fingers at the side of the solenoid opposite the chute 12. Thus, when the solenoid 28 is energized the contact fingers 31 and 32 are moved into the chute through the openings 50 and 51 against the force of the spring 69. The distance between the contact fingers 31 and 32 is determined by the diode or device being tested and is such that the fingers make electrical contact across the device to determine its electrical direction as described hereinafter. Thus, in this embodiment the fingers are spaced by a distance greater than the length of the glass envelope to make electrical contact with the metal sleeves at each end thereof.

The solenoid gates and sensing contacts are suitably mounted upon the chute 12 by means of a chassis 71 supported upon the chute by brackets 72. Electrical connections are made to the solenoids by means of an electrical connector 73 mounted upon the chassis 71.

Figure 3:
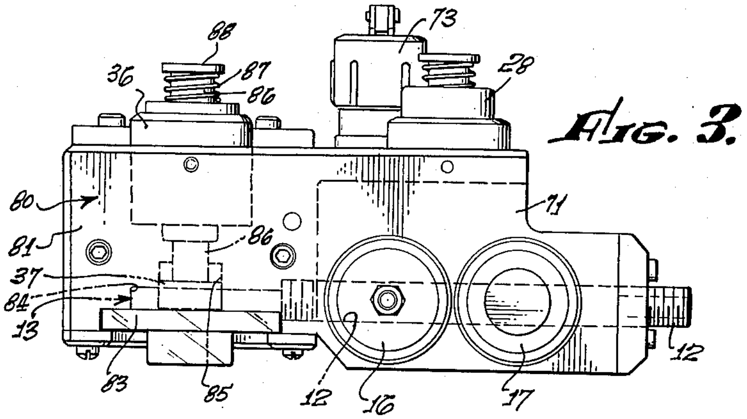
Figure 3 is a view taken along line 3—3 of Figure 2.
Figure 4:
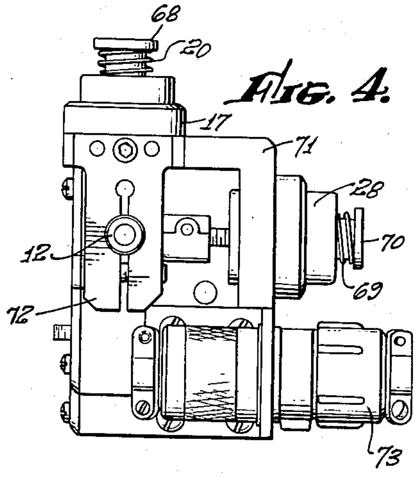
Figure 4 is a view taken along line 4—4 of Figure 2.
Figure 6:
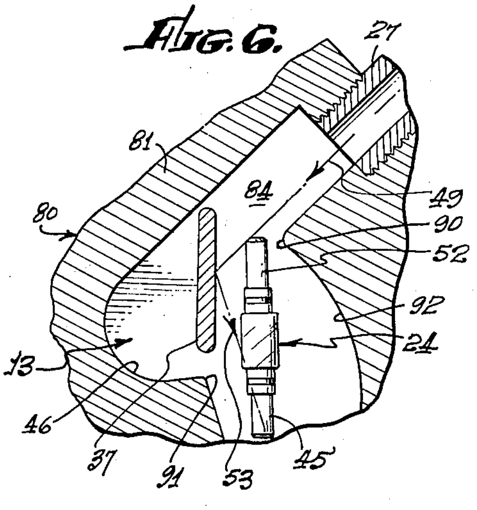
Figure 6 is a view of the orienting chamber shown in Figure 5 in which the orienting vane is extended.

At the end of the chute 12 and coextensive therewith the orienting means 80 is positioned such that a diode released by the pin 25 moves to the end of the chute 12 and into the orienting chamber 13 defined by the orienting means. The orienting means includes a body portion 81 defining an opening 13 therein in the shape shown in Figures 2, 5 and 6. As shown in Figure 3, the chamber 13 is closed at the inner side by the body portion 81 forming an inner wall 84 and is closed at the other side by an insertable cover 83 which in this embodiment is a Plexiglas plate 83 slidably engageable with the body portion. A solenoid 36 is mounted upon the body portion at the side opposed to the chamber 13 with the solenoid axis substantially perpendicular to the wall 84 of the chamber formed by the body portion. A vane 37 is affixed to the solenoid for transverse movement into and out of the chamber 13 through an opening 85 defined by the wall 84. Suitable openings and mounting means are provided for positioning and mounting the solenoid upon the body portion. The vane 37 is affixed to the solenoid plunger 86 which is normally urged outwardly of the chamber 13 by a spring 87 maintained in compression between the solenoid 36 and a flange 88 affixed to the plunger 86 at the side of the solenoid opposed to the vane 37. Thus, the spring 87 normally maintains the vane 37 out of the chamber 13 and when the solenoid 36 is energized the vane 37 is moved into the chamber 13.

The chamber 13 is greater in thickness than the largest diameter of the diodes and is formed substantially as shown in Figures 2, 3, 5 and 6. The size of the chamber is dependent upon the length of the diodes or other device being oriented and is such that a diode passing into the chamber 13 from the chute 12 will be reversed in end-wise direction when the chamber is unobstructed by the vane 37. That is, the distance from the first support point 90 to the support surface 46 terminating in the second support point 91 is such that when a diode 23 moves into the chamber 13 it is supported by the surface ending at the support point 90 until the center of gravity of the diode passes the support point 90. As the center of gravity of the diode passes the point 90 it tips and is carried forward by its momentum until the forward end strikes the surface 46 as shown in Figure 5 and the rearward end 52 is unsupported. The surface 46 is curved such that the forward end 45 of the diode is free to travel upward as the unsupported end 52 falls downward. Thus, the support point 91 acts as a pivot point to reverse the end-wise direction of the diode. Accordingly, the second support point 91 is beneath the first suport point 90 and the distance between the first point 90 and second point 91 is less than the length of the diode but of sufficient length to prevent support at both points simultaneously. The curved surface 92 is so formed that the diode may pivot freely until the end 52 is downward and the diode slips from the second support point 91. The optimum configuration and size of the chamber 13 is dependent upon the diode or device being reversed in direction and can be readily determined by one skilled in the art in view of the description and drawing herein. The vane 37 is positioned substantially vertically in the illustrated embodiment but its position is determined such that the forward end 45 of the diode cannot enter the portion of the chamber 13 defined by the surface 46 but is, rather, deflected downward. Thus, the chamber defined when the vane 37 is inserted is not sufficiently wide to allow the diode to reverse and it is caused to move to the chamber outlet 94 in the same end-wise position in which it entered the chamber. The chamber outlet 94 is then coextensive with a second chute 14 which delivers the diodes in oriented direction to the next operational stage such as, for example, the color coding machine.

In operation, referring to Figures 1 through 9 the diodes are received by chute 12 from Syntron 11. For the purposes of example, two diodes, 23 and 24 are shown within tube 12 in Figure 5. Diode 23 is shown to be oriented in the forward direction, while diode 24 is oriented in the back direction. Assuming diode 23 is the first in the line of diodes received by tube 12, it will come to rest when it strikes pin 25 of solenoid 16, the pin of which is shown to extend through hole 26 within the wall 27 of tube 12. As discussed hereinbefore the spring 19 will cause solenoid 16 to be in a normally closed position, i.e., without energization thereof, pin 25 will be extended. Thus solenoid 16 acts as a gate which is normally closed.

Diode 24 and those following will stack up behind diode 23. While pin 25 remains in the normally closed position with diode 23 resting thereupon, solenoid 28 which may best be seen in Figure 3 will receive a signal from the control circuit (shown in Figure 9) causing contact fingers 31 and 32 (shown in Figures 2 and 7) to extend into holes 50 and 51 in wall 27 of tube 12. Contact fingers 31 and 32 are connected to a sensing circuit shown in Figure 9 and hereinafter to be described to determine the direction of orientation of diode 23, i.e., whether it is facing in the forward or back direction. An electrical signal from the control circuit representative of the direction of orientation of diode 23 is thereafter presented to solenoid 36 which actuates orienting vane 37 located within orienting chamber 13. Now that the direction of orientation of diode 23 has been determined, a signal indicating the same is presented to solenoid 36; the control circuit will then present a signal to solenoid 16 causing plunger 25 to be retracted from hole 26, thus permitting diode 23 to fall into chamber 13.

Simultaneous with the activation of solenoid 16 there will be presented a signal to solenoid 17 to cause pin 39 thereof to extend into hole 40 in wall 27 of chute 12 resulting in spring 18 being forced against diode 24 to hold it in position. As discussed hereinbefore, without energization, solenoid 17 acts as an open gate.

After diode 23 has passed into chamber 13, an electrical signal from the control circuit will cause pin 25 to again extend into hole 26, and simultaneously another electrical signal from the control circuit will cause pin 39 to recede from hole 40 permitting diode 24 to fall into the testing position formerly occupied by diode 23, it now resting against pin 25. Let us now again direct our attention to diode 23 which has by now fallen into orienting chamber 13. Again assuming that it is desired to orient all of the diodes in the back direction as they enter chute 14, the signal produced by contacts 31 and 32 which signal is presented to solenoid 36 will not cause vane 37 to extend, but will on the contrary permit it to remain in the retracted position which may best be seen in Figure 5. Thus, the forward end 45 of diode 23 will strike curved portion 46 of orienting chamber 13. The momentum of diode 23 will cause the forward end 45 to begin to move upward in the direction of arrow 47. The orientation of diode 23 after it has climbed up curved portion 46 of chamber 13 will appear as shown in phantom in Figure 5. The diode will then again begin to fall, this time with the end 52 pointing down as the diode enters chute 14. The diode is now facing in the back direction as desired. Thus, a diode falling into chamber 13 will have its direction reversed if vane 37 remains in the retracted position as shown in Figure 5.

As shown in Figure 5 diode 24 which is initially lined up behind diode 23 is oriented in the forward direction. After the testing and orienting operation associated with diode 23 is completed, diode 24, as was previously explained, will then be brought to rest at the test station against pin 25 of solenoid 16. Thereafter, contact fingers 31 and 32 will upon energization of solenoid 28, extend into holes 50 and 51 of chute 14 in order to sense the direction of orientation of diode 24. Inasmuch as diode 24 is oriented in the forward direction, an electrical signal will be produced by the control circuit in a manner hereinafter to be explained. This signal will energize solenoid 36 causing vane 37 connected to the plunger thereof to extend into orienting chamber 13. This may best be seen in Figure 6.

Diode 24 upon energization of solenoid 16 will fall into the orienting chamber 13. Of course, simultaneous with the energization of solenoid 16, solenoid 17 will be energized to hold back the remaining diodes in the same manner as discussed with respect to the release of diode 23.

As vane 37 is extended, the forward end 45 of diode 24 will, as it falls in the direction of arrow 49, strike vane 37 causing it to alter its direction in the downward direction as indicated by arrow 53. Consequently, the direction of orientation of diode 24 unlike that of diode 23, will not be reversed by chamber 13.

In a like manner all of the remaining diodes will be oriented in the back direction.

Figure 9:
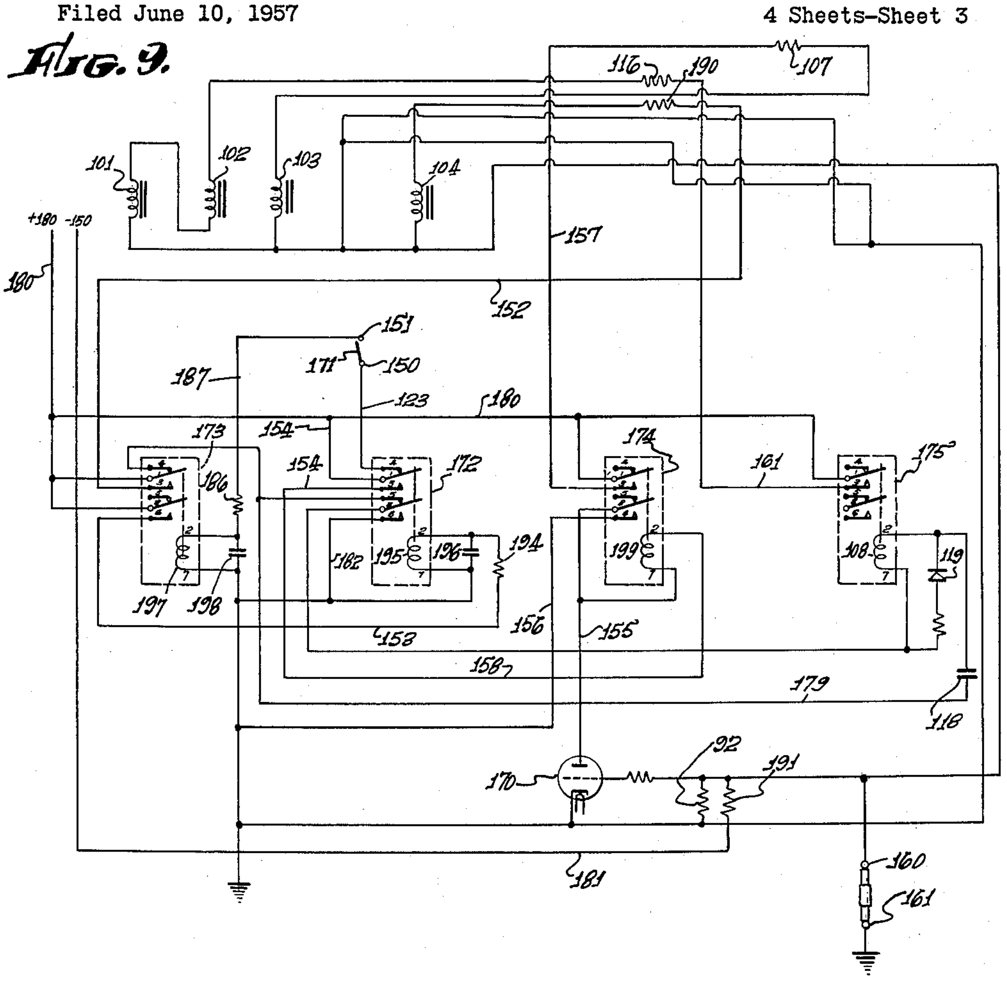
Figure 9 shows an illustrative circuit which may be used to control the apparatus according to one embodiment of the present invention.

The operation of the control circuit hereinabove referred to and shown in detail in Figure 9 will now be explained.

Coils numbered 101, 102, 103 and 104 represent the windings of solenoids 16, 17, 36 and 28 respectively. Leads 180 and 181 are connected to a source of voltage of +180 volts and −150 volts respectively, not shown. A test diode, which in the example shown in Figure 5 is numbered 23 will, when in position, make contact with input terminals 160 and 161 respectively. This contact will occur when contact fingers 31 and 32 of solenoid 28 are extended into holes 50 and 51 within chute 12 to make contact with the electrodes of the test diode. The sequence of operation of the solenoids associated with coils 101 through 104 begins with the closing of switch 171. Before the switch 171 is closed a voltage of +180 appears at terminal 150 through relay contact 4 and arm 1 of relay 172 and lead 180. The contact arms 1 and 8 of relay 172 are in a normally closed position as are the arms of relays 175, 173 and 174. After switch 171 is closed, relay 173 becomes energized through resistor 186 as +180 volts is presented thereto through terminal 151 and lead 187. The energization of relay 173 will thus cause arm 1 thereof to transfer contact from contact 4 to contact 3 and simultaneously transfer contact of arm 8 thereof from contact 5 to contact 6. Lead 152 therefore will carry a voltage of +180 volts from lead 180 through contact 3 and arm 1 of relay 173, which will cause current to flow through resistor 190 and coil 104 of solenoid 28. Hence, the first step in the operation is the advance of contact fingers 31 and 32 to make contact with the electrodes of the test diode. Again, assuming that the test diode is facing in the forward direction, which in this case would mean that the cathode is connected to terminal 161 with the anode being connected to terminal 160, amplifier 170 will remain biased at cutoff; this due to the fact −150 volts is carried by lead 181 through resistor 191 to thus produce a negative voltage sufficient to cut off the amplifier.

Energization of relay 173, as previously discussed, will cause arm 8 to make contact with contact 6 thereof, thus +180 volts will be presented to relay 172 through lead 153 and resistor 194 to coil 195 of relay 172 which will energize relay 172 after a short time delay during which capacitor 196 is charging. Upon energization of relay 172, arm 1 thereof will disconnect from contact 4 thus removing +180 volts from terminal 150 through contact 4, assuming that switch 171 is at this time still closed. Thus, +180 volts will be removed from coil 197 of relay 173 as terminal 151 will no longer be connected to +180 volts. As a result, relay 173 will become deenergized after a short time delay due to the discharge of capacitor 198 through coil 197. Now, as lead 154 will be connected to +180 volts through contact 3 and arm 1 of relay 172, relay 174 and amplifier 170 through coil 199 of relay 174 will become enabled by +180 volts appearing on lead 154. Relay 174 will not necessarily, however, become energized if amplifier 170 is in the conducting state upon the application of +180 volts to coil 199. In this case we have assumed that amplifier 170 is not in the conducting state and therefore relay 174 will thus not become energized. When, however, relay 174 is energized the plate circuit, i.e., lead 155 of amplifier 170 is tied to ground through contact 6, arm 8 of relay 174 and lead 156, thus locking relay 174 in the energized state. Further, when relay 174 is energized orienting solenoid 36 will become energized as +180 volts will be presented to its coil 103 through resistor 107, lead 157, contact 3 and arm 1 of relay 174 and lead 180. Returning to relay 172 when arm 8 makes contact with contact 6 a circuit is completed from ground through lead 182, contact 6 and arm 8 of relay 172, lead 158, coil 108, capacitor 118 of relay 175, lead 179, contact 4 and arm 1 of relay 173 (now deenergized) and lead 180 to +180 volts allowing charging current from capacitor 118 to energize relay 175 for a short duration. Observe that this current flow presents a voltage to diode 119 in its reverse direction. When relay 175 is energized +180 volts from lead 180 appears at resistor 116 through lead 161 and contact 3 and arm 1 of relay 175. This energizes coils 101 and 102 of solenoids 16 and 17 respectively, thus releasing the just tested diode, dropping the same to the orienting chamber and holding diode 24.

When relay 173 is deenergized as previously discussed, the +180 volts is removed from lead 153 allowing capacitor 196 to discharge through coil 195 of relay 172, thus deenergizing relay 172 after a short time delay, which should be sufficient time to allow the test diode to drop. The deenergization or relay 172 removes +180 volts from lead 154 and coil 199 of relay 174, thus allowing it to become deenergized (if it had been energized to begin with). Also lead 158 is disconnected from lead 182 upon deenergization of relay 172, as arm 8 and contact 6 thereof become disconnected. When arm 8 contacts contact 5 of relay 172, lead 158 is connected to lead 180 allowing capacitor 118 to discharge through diode 119 (which is now in the conducting state) through resistor 109, lead 158, contact 6 and arm 8 of relay 172 and lead 199 in such a manner as to not energize relay 175 again. When relay 175 deenergizes it removes +180 volts from resistor 116 and coils 101 and 102 of solenoids 16 and 17 respectively, thus allowing diode 24 to be dropped into the test position.

While the above description of the control circuit associated with the apparatus of the present invention has been carried out by the use of electrical circuitry involving relays and the like, the timing sequence for the operation of the solenoids herein above referred to may equally as well be carried out by the use of a series of cams mounted upon a rotating shaft or the like.

Further, other modifications may be made in the apparatus without departing from the spirit of the invention, the orienting chamber, for example, need not necessarily be completely continuous, but may instead be partially opened and also the back end 46 thereof need not be closed, but may instead be merely an inclined plane.

Figures 10, 11:
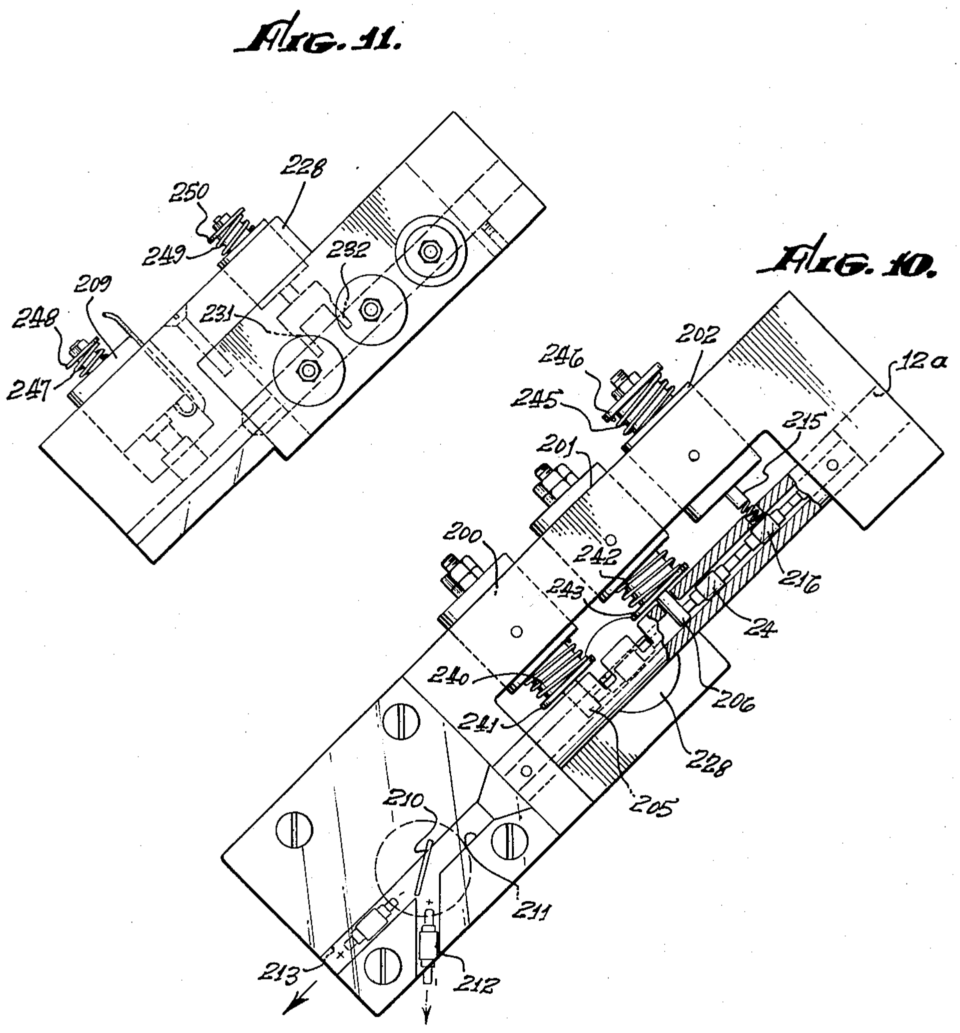
Figure 10 is an enlarged view of a modification of the apparatus of the present invention.
Figure 11 is a partial plan view of the apparatus of Figure 10.

The apparatus of the present invention may thus be utilized to perform a sorting rather than an orienting operation. In Figures 10 and 11 there is shown an alternative embodiment illustrative of this modification. Therein three solenoids, 200, 201 and 202 respectively are mounted upon a chassis for transverse movement of pins 205, 206 and 215 respectively into and out of the inclined chute 12*a* in a manner similar to that previously described in connection with solenoids 16 and 17 in the embodiment of Figures 1 through 9. As in the previously described embodiment the diode to be tested will be sent down chute 12*a* to come to rest against pin 206 of the second solenoid 201 which is urged to a normally closed position by a spring 240 maintained in compression between the solenoid 200 and the flange 241 affixed to the pin 205. At a distance along the inclined chute 12*a* substantially equal to but greater than the length of a diode between pins 206 and 215, the third solenoid 202 is normally urged to the open position by a spring 245 mounted in compression between the solenoid 202 and a flange 246 affixed to the solenoid plunger.

Upon energization of solenoid 201, pin 206 thereof will retract thereby permitting the test diode 24 to fall into the test position as it will come to rest upon pin 205 of the first solenoid 200 which is urged to a normally closed position by a spring 240 maintained in compression between the solenoid 200 and the flange 241 affixed to the pin 205.

Immediately after energization of solenoid 201 to permit release of the diode to the test station it will again become deenergized thereby closing the gate by the extension of pin 206 in chute 12*a*. Thereafter solenoid 202 will become energized to permit release of diode 216 and it will now come to rest against pin 206 thus replacing diode 24 and also permitting the next diode in line to fall. Thus, the diode being tested is always mechanically and electrically isolated from all others to reduce the possibility of error in the testing operation.

Solenoid 228 is mounted for transverse movement of contact fingers 231 and 232 into the chute 12*a* to make electrical contact with the electrodes of the diode 24 in the test position between pins 205 and 206. The contact fingers are normally urged out of the chute 12*a* by a spring 249 mounted in compression between the solenoid 228 and a flange 250 affixed to the solenoid plunger.

As shown in Figure 11, the orienting chamber in this alternative embodiment defines a passage 211 coextensive with the chute 12*a* and branches into a first branch chute 212 and a second branch chute 213. A vane 210 is mounted by means of a solenoid 209 for transverse movement into and out of the orienting chamber and is normally urged to the open position out of the chamber by a spring 247 mounted in compression between the solenoid 209 and a flange 248 affixed to the plunger of the solenoid. The vane 210 is positioned, when in the chamber, such that it closes chute 213 and diverts a diode moving in passage 211 to the chute 212, while if the vane is retracted the diode will travel undiverted from passage 211 into and through chute 213.

A control circuit somewhat similar to that described hereinabove and typically illustrated in Figure 9 will control the sequence of solenoids 200, 201, 202, 228 and selecting solenoid 209 respectively. This modified control circuit will have a built in memory or standard to compare the electrical signal produced upon the contact of fingers 31 and 32 with the diode in the test position to ascertain certain predetermined electrical characteristics therefrom. If the diode in the test station falls within one range of characteristics a signal will be presented to solenoid 209 causing it to become energized, thus advancing vane 210 connected to the plunger thereof. After the test of test diode has been completed, the test diode will be released by retraction of pin 205 allowing it to fall into chute 211. As vane 210 is extended, the diode will be diverted or directed into chute 212, while if it is not extended, but remains retracted, it will continue its fall within chute 213. Thus, the diodes received from chute 212 and those received from chute 213 will have been separated according to any predetermined electrical tests as desired. Thereafter, plunger 206 of solenoid 201 will be retracted permitting diode 24 to fall into the test position while spring biased pin 215 of solenoid 202 will hold back diode 216 and those following. In a like manner diode 24 will be tested and subsequently directed into either chute 212 or 213 depending upon its electrical character as compared to the memory in the control circuit.

What is claimed as new is:

1. Apparatus for delivering a plurality of unidirectional conducting semiconductor diodes all oriented in one of two predetermined orientations such that each of said diodes are similarly oriented and aligned with respect to its direction of conduction, said diodes being cylindrical about a vertical axis through the length thereof said apparatus comprising: an inclined guideway for receiving said diodes, each of said diodes being randomly aligned in said guideway in either the forward or back direction; means for selectively halting the first of said diodes at a sensing station, said sensing station being located intermediate the ends of said guideway; electrical sensing means located adjacent said sensing station, said sensing means being adapted to produce an electrical signal only if said diode at said station is aligned in one of said predetermined orientation, said electrical signal being produced only if current of a predetermined value passes through said diode; and means for selectively reversing the direction of orientation of each said aligned diodes which is not oriented in said predetermined orientation when presented to said sensing means said means for selectively reversing being coupled to and controlled by said electrical sensing means, whereby said diodes are delivered from said last named means aligned in said predetermined orientation.

2. Apparatus for delivering a plurality of unidirectional conducting electronic devices randomly oriented in one of two predetermined orientations such that each of said devices is similarly oriented and aligned with respect to its direction of conduction, said devices being cylindrical about a vertical axis through the length thereof said apparatus comprising: an inclined guideway for receiving said devices, each of said devices being randomly aligned in either of said orientations; means for selectively halting the first of said devices at a sensing station intermediate the ends of said guideway; sensing means for electrically sensing the orientation of the device at said sensing station, said sensing means producing an electrical signal only if said device is aligned in a first of said predetermined orientations said electrical signal being produced only if current of a predetermined value passes through said devices; and an orienting chamber for selectively reversing the direction of orientation of said aligned devices, in response to said electrical signal, which are not oriented in one of said predetermined orientations, by actuation of said chamber being dependent upon and controlled by said electrical signal, said chamber being located at the lower end of said inclined guideway to receive said devices therefrom; whereby said devices are delivered from said chamber all aligned in said first predetermined orientation.

3. Apparatus for delivering a plurality of unidirectional conducting electronic devices randomly oriented in one of two predetermined orientations such that each of said devices is similarly oriented and aligned with respect to its direction of conduction, said apparatus comprising: an inclined guideway for receiving said devices, each of said devices being randomly aligned in either of said orientations; means for selectively halting the first of said devices at a sensing station intermediate the ends of said guideway; sensing means for electrically sensing the orientation of the device at said sensing station, said sensing means producing an electrical signal only if said device is aligned in a first of said predetermined orientations; an orienting chamber for selectively reversing the direction of orientation of said aligned devices, said chamber being located at the lower end of said inclined guideway to receive said devices therefrom; and upset means for selectively permitting said devices to pass through said chamber without having their orientation reversed, said upset means being responsive to said electrical signal, whereby said devices are delivered from said chamber all aligned in said first predetermined orientation.

4. Apparatus for delivering a plurality of unidirectional conducting electronic devices in one of two predetermined orientations such that each of said devices is similarly oriented and aligned with respect to its direction of conduction, said apparatus comprising: an inclined guideway for receiving said devices, each of said devices being randomly aligned in either of said orientations; first and second gate means spaced along said guideway, said first gate means being in a normally closed position for selectively halting the movement of said devices, said second gate means being in a normally open position said first and second gate means being spaced apart a distance greater than the length of one of said devices but less than the length of two of said devices; means for selectively opening said first gate means and closing said second gate means thereby to release only the first of said devices; sensing means located intermediate said first and second gate means for electrically sensing the direction of conduction of the first of said devices, said sensing means producing an electrical signal only if said first unidirectional device is aligned in a first of said predetermined orientations; and an orienting chamber for selectively reversing the direction of orientation of said aligned devices, said chamber being located at the lower end of said inclined guideway to receive said devices therefrom; said chamber being operative selectively to reverse said diodes in response to said electrical signal, whereby said devices are delivered from said chamber all aligned in said predetermined orientation.

5. Apparatus for delivering a plurality of unidirectional conducting electronic devices in one of two predetermined orientations such that each of said devices is similarly oriented and aligned with respect to its direction of conduction, said apparatus comprising: an inclined guideway for receiving said devices, each of said devices being randomly aligned in either of said orientations; first and second gate means spaced along said guideway, said first gate means being in a normally closed position for selectively halting the movement of said devices, said second gate means being in a normally open position; means for selectively opening said first gate means and closing said second gate means to release only the first of said devices; sensing means located intermediate said first and second gate means for electrically sensing the direction of conduction of the first of said devices, said sensing means producing an electrical signal only if said first unidirectional device is aligned in a first of said predetermined orientations; an orienting chamber for selectively reversing the direction of orientation of said aligned devices, said chamber being located at the lower end of said inclined guideway to receive said devices therefrom; and upset means for selectively permitting said devices to pass through said chamber without having their orientation reversed, said upset means being responsive to said electrical signal, whereby said devices are delivered from said chamber all aligned in said predetermined orientation.

6. Apparatus for delivering a plurality of unidirectional conducting semiconductor diodes all oriented in the back direction, said apparatus comprising: an inclined guideway for receiving said diodes, each of said diodes being randomly aligned in said guideway in either the forward or back direction; first and second gate means spaced along said guideway, said first gate means being in a normally closed position for selectively halting the movement of said diodes, said second gate means being in a normally open position said first and second gate means being spaced apart a distance greater than the length of one of said devices but less than the length of two of said devices; means for selectively opening said first gate means and closing said second gate means thereby to release only the first of said diodes; sensing means located intermediate said first and second gate means for electrically sensing the direction of conduction of the first of said diodes, said sensing means producing an electrical signal only if said first diode is aligned in the back direction; and an orienting chamber for reversing the direction of orientation of said aligned diodes, which are oriented in the forward direction, said chamber being located at the lower end of said inclined guideway to receive said diodes therefrom; whereby said diodes are delivered from said chamber all aligned in the back direction.

7. Apparatus for delivering a plurality of unidirectional conducting semiconductor diodes all oriented in the back direction, said apparatus comprising: an inclined guideway for receiving said diodes, each of said diodes being randomly aligned in said guideway in either the forward or back direction; first and second gate means spaced along said guideway, said first gate means being in a normally closed position for selectively halting the movement of said diodes, said second gate means being in a normally open position; means for selectively opening said first gate means and closing said second gate means to release only the first of said diodes; sensing means located intermediate said first and second gate means for electrically sensing the direction of conduction of the first of said diodes, said sensing means producing an electrical signal only if said first diode is aligned in the back direction; an orienting chamber for selectively reversing the direction of orientation of said aligned diodes, said chamber being located at the lower end of said inclined guideway to receive said diodes therefrom; and upset means for selectively permitting said diodes to pass through said chamber without having their orientation reversed, said upset means being responsive to said electrical signal, whereby said diodes are delivered from said chamber all aligned in the back direction.

8. Apparatus for orienting a plurality of randomly oriented unidirectional conducting semi-conductor diodes so that each of said diodes is similarly oriented in one of two predetermined orientations and aligned with respect to its direction of conduction, said apparatus comprising: an inclined guideway for receiving said diodes, each of said diodes being randomly aligned in either of said orientations; first solenoid means located intermediate the ends of said guideway and adapted to selectively halt the first of said diodes received by said guideway at a test station; second solenoid means located intermediate said first solenoid means and the upper end of said inclined guideway; electrical contact means attached to second solenoid means and adapted to selectively make contact with the electrodes of the diodes at said test station upon energization of said second solenoid means; electronic sensing means coupled to said electrical contact to determine the direction of conduction of said first diode; third solenoid means located intermediate said second solenoid means and the upper end of said inclined guideway, said third solenoid means being adapted to selectively halt the second of said diodes aligned in said guideway during the period when said diode at said test station is being released therefrom upon energization of said first solenoid means; an orienting chamber for selectively reversing the direction of orientation of said diodes, said chamber being located at the lower end of said inclined guideway to receive said diodes therefrom; upset means; and fourth solenoid means connected to said chamber and adapted to selectively advance said upset means normally into said chamber to permit passage of a diode through said chamber without having its direction of orientation reversed, said fourth solenoid means being energized in response to said electrical signal.

9. Apparatus for delivering a plurality of unidirectional conducting electronic devices randomly oriented in one of two predetermined orientations such that each of said devices is similarly oriented and aligned with respect to its direction of conduction, said apparatus comprising: means for receiving a plurality of said devices in random alignment and delivering said devices all aligned in end-to-end relation; an inclined guideway having its upper end connected to the output of said last named means for receiving said aligned devices, each of said devices being randomly aligned in either of said orientations; means for selectively halting the first of said devices at a sensing station intermediate the ends of said guideway; sensing means for electrically sensing the orientation of the device at said sensing station, said sensing means producing an electrical signal only if said device is aligned in a first of said predetermined orientations; an orienting chamber for selectively reversing the direction of orientation of said aligned devices, said chamber being located at the lower end of said inclined guideway to receive said devices therefrom; and upset means for selectively permitting said devices to pass through said chamber without having their orientation reversed, said upset means being responsive to said electrical signal, whereby said devices are delivered from said chamber all aligned in said first predetermined orientation.

10. An apparatus for selectively electrically testing each of a plurality of two ended devices to produce an electrical output signal representative of a predetermined electrical characteristic of said device comprising: an inclined guideway for receiving said devices in end to end alignment; first and second gate means spaced along said guideway, said first gate means including a solenoid actuated pin with the pin thereof selectively extending into said guideway for selectively halting the movement of the first device to be tested, said first gate means being maintained in a normally closed position, said second gate means including a second solenoid actuated pin with the pin thereof selectively extending into said guideway to selectively engage the surface of the device rearward of the device being tested, said second gate means being maintained in a normally open position; electrical sensing means located intermediate said first and second gate means for testing a predetermined electrical characteristic of the device; and control means for successively, simultaneously presenting an electrical signal to said first and second solenoids for opening said first gate means and closing said second gate means to release only the first device which has been tested.

11. Electrical article testing apparatus for directing a plurality of randomly arranged articles in to a predetermined ordered arrangement, each of said articles having an electrical characteristic which may be measured between first and second electrodes on said article, said apparatus comprising: a test station; means to sequentially present said articles individually to said test station; means at said test station to derive from each article a signal determined by said electrical characteristic of said article; a chamber; means to feed each of said articles sequentially and individually from said test station to said chamber; movable means in said chamber to control the mode of exit of said articles from said chamber; and means to control said movable means when a given article is fed into said chamber in response to the signal derived from said given article from said test station.

12. Electrical article testing apparatus for directing a plurality of randomly arranged articles into a predetermined ordered arrangement, each of said articles having an electrical characteristic which may be measured between first and second electrodes on said article, said apparatus comprising: a test station; means to sequentially present said articles individually to said test station; means at said test station to derive from each article a signal determined by said electrical characteristic of said article; a chamber; means to feed each of said articles sequentially and individually from said test station to said chamber; movable means selectively projecting into said chamber to vary the shape of said chamber thereby to control the mode of exit of said articles from said chamber; and means to control said movable means when a given article is fed into said chamber in response to the signal derived from said given article from said test station.

13. Apparatus for delivering a plurality of unidirectional conducting electronic devices randomly oriented in one of two predetermined orientations such that each of said devices is similarly oriented and aligned with respect to its direction of conduction, said apparatus comprising: an inclined guideway for receiving said devices, each of said devices being randomly aligned in either of said orientations; means for selectively halting the first of said devices at a sensing station intermediate the ends of said guideway; sensing means for electrically sensing the orientation of the device at said sensing station, said sensing means producing an electrical signal only if said device is aligned in a first of said predetermined orientations; and an orienting chamber for selectively reversing the direction of orientation of said aligned devices, in response to said electrical signal, which are not oriented in one of said predetermined orientations, said chamber being located at the lower end of said inclined guideway to receive said devices therefrom, said orienting chamber including movable means which may be selectively projected within said chamber to effectively vary the shape thereof, thereby to selectively alter the direction of alignment of said devices; whereby said devices are delivered from said chamber all aligned in said first predetermined orientation.

14. Electrical article orienting apparatus for producing a predetermined ordered relationship among a plurality of randomly arranged articles, each of said articles having an electrical characteristic which may be measured between first and second electrodes on said articles and with respect to which said ordered relationship is to be produced, said apparatus comprising: means to sequentially present said articles individually to a test station; means at said test station to derive from each article a signal determined by said electrical characteristic of said article; an orienting chamber; means to feed each of said articles sequentially and individually from said test station to said orienting chamber; movable means in said orienting chamber to control the mode of exit of said articles from said chamber, and means to control said movable means when a given article is fed to said chamber in response to the signal derived from said given article at said test station.

References Cited in the file of this patent

UNITED STATES PATENTS

| | | |
|---|---|---|
| 2,662,626 | Graham | Dec. 15, 1953 |
| 2,762,015 | McGrath | Sept. 4, 1956 |
| 2,845,164 | Stahl | July 29, 1958 |